United States Patent Office 3,635,911
Patented Jan. 18, 1972

3,635,911
POLYAMIDES HAVING ENHANCED RESISTANCE TO LIGHT DEGRADATION
Gene C. Weedon, Richmond, Va., and Robin B. Mumford, Middletown, N.J., assignors to Allied Chemical Corporation, New York, N.Y.
No Drawing. Filed May 14, 1969, Ser. No. 824,697
Int. Cl. C08g 20/38
U.S. Cl. 260—78 R
6 Claims

ABSTRACT OF THE DISCLOSURE

Acid dyeable polyamide filaments having enhanced resistance to light degradation are prepared by polymerizing the polyamide-forming materials in the presence of at least 10 equivalents per $10^6$ gms. of polymer of p-toluenesulfonic acid and less than about 90 equivalents per $10^6$ gms. of a primary diamine such as m-xylenediamine.

BACKGROUND OF THE INVENTION

This invention relates to modified synthetic linear polyamides having an enhanced resistance to light degradation and to a process for producing said polyamides.

Synthetic linear polyamide substances useful in the practice of the instant invention are of the general type characterized by high molecular weight, fiber-forming properties and the presence of recurring carbonamide groups as an integral part of the polymer chain, said groups being separated by at least two carbon atoms. Other general characteristics include high melting point, pronounced crystallinity and a high degree of resistance to attack by a wide variety of organic and inorganic materials, except mineral acids, formic acid, and the phenols. Upon hydrolysis with strong mineral acids, the polymers revert to the reactants from which they are formed.

The simple polyamides useful in this invention include those that can be made by heating a self-polymerizable monoamino-monocarboxylic acid or the lactam thereof in the presence of a suitable accelerator, said lactam being characterized by a chain length of at least 5 carbon atoms between a carboxyl and amino group. The most common polyamides, illustrative of the foregoing, are prepared by condensing e-caprolactam in the presence of an accelerator, such as w-aminocaproic acid. This polymerization is usually conducted in the melt, and if desired in the presence of a solvent, such as a phenol. It generally occurs with remarkable smoothness and leads to highly polymeric products applicable for various purposes.

While yarns produced from the above polyamides have an affinity for acid dyestuffs, a loss in dye receptivity is attendant with exposure of the yarn to ultraviolet light from any source, including fluorescent. This characteristic is most noticeable in yarns prepared for deep-shade dyeing through reaction of polyamide with a diamine which produces more dye sites. As a result of exposing undyed amine terminated yarns to ultraviolet light, streaks and uneven dyeing appear in the dyed fabric. Moreover, it is found that upon ageing, deep-dye yarns show a perceptible loss of dyeability, causing streaks in fabrics, carpets and other textile products.

Accordingly, it is the principal object of the present invention to promote resistivity to fading from exposure to light of synthetic linear polyamides which have been reacted with primary diamines to obtain deeper dye shades when dyed wtih acid type dyestuffs. Another object is to achieve more uniformly dyed textile products from the polymers as described herein. Other objects and advantages of the instant invention will become more apparent upon examination of the following more detailed disclosure.

SUMMARY OF THE INVENTION

In accordance with the present invention, deep-dyeing, light-stable, linear polyamides are prepared by heating polyamide-forming reactants in the presence of at least 10, and preferably at least 20, equivalents (per $10^6$ gms. of polymer) of p-toluenesulfonic acid and in the presence of less than about 90 equivalents (per $10^6$ gms. of polymer) of a primary diamine which includes:

m-xylylene diamine, o-phenylene diamine, bis-aminocyclohexyl methane, menthane diamine (1,8 diamino p-menthane), hexamethylene diamine The diamine imparts the desired deeper dyeing characteristics to the polyamide by providing a larger number of amine end groups than are normally present in the polyamide. This larger number of amines, however, also increases the sensitivity of the polyamide to light and subsequent attack of the amine ends. It is believed that salt formation in situ between the p-toluenesulfonic acid and the amine end groups provides the observed stabilization of the amine to light attack.

The term "equivalents" as herein used in the specification and appended claims is defined as the number of reactive end groups added to the polymer composition per $10^6$ gms. of polymer.

The discovery has been made that the combined use of p-toluenesulfonic acid and primary diamines, in selected amounts, will produce polyamides wherein the primary diamine moiety contributes additional dye sites to the polyamide and all the polyamide dye sites exhibit enhanced resistivity to light degradation due to sequestration or protection by the p-toluenesulfonic acid component.

DESCRIPTION OF THE PREFERRED EMBODIMENTS

The improvement of the instant invention is most advantageously employed in polyamides prepared from e-caprolactam in the presence of about 10 to 40 particularly 20 to 40, and preferably about 30, equivalents of p-toluenesulfonic acid per $10^6$ gms. of polymer and less than about 90 equivalents of a primary diamine per $10^6$ gms. of polymer, preferably m-xylene diamine. When fine denier yarns are prepared from an e-polycaproamide material having incorporated therein m-xylylenediamine and about 20 equivalents of p-toluenesulfonic acid, there is a substantial improvement in the resulting acid dye receptivity of said polyamide material. For example, when 40 denier yarn consisting of 12 filaments to the strand and 70 denier yarn consisting of 32 filaments to the strand are prepared from an e-polycaproamide material, modified according to this invention, and having incorporated therein about 20 equivalents of p-toluenesulfonic acid, there is a substantial improvement in the acid dye receptivity of said polycaproamide material.

When heavy denier yarns are prepared from an e-polycaproamide material modified according to this invention, we prefer to incorporate therein about 30 equivalents of p-toluenesulfonic acid. For example, when 210 denier yarn consisting of 14 filaments to the strand are prepared from an e-polycaproamide material, modified according to this invention and having incorporated therein about 20 equivalents of p-toluene sulfonic acid, there is a substantial improvement in the acid dye receptivity of said polycaproamide material.

The simple polyamides preferred for use in the preparation of the deep-dyeable polyamides of this invention are of the type having recurring amide groups and carboxyl groups as an integral part of the main polymer chain, wherein said amide and carboxyl groups are separated by at least 5 carbon atoms. They are prepared by procedures well-known in the art and commonly employed in manufacture. For example, e-caprolactam melt is formed and reacted in the presence of a small amount of w-aminocaproic acid at temperatures between 250 and 280° C. under a nitrogen blanket containing no more than about 20 p.p.m. of oxygen, until the desired fiber-forming viscosity is reached. The polymerizate is then extruded from the reaction vessel, pelletized, washed, dried and spun or drawn into filaments.

The p-toluene sulfonic acid component can be added at various stages in the preparation of filaments modified according to this invention. The acid component can be added to the polyamide melt, during the polymerization cycle or injected during extrusion. Other methods of effecting the acid addition include impregnating the prepared polyamide pellets with an aqueous solution of the acid component and applying an aqueous solution of the acid component to drawn filaments as a finish. We have found that it is most desirable to add the acid component prior to spinning the polyamide polymer into filaments, preferably by incorporating said acid with the polyamide in the reaction kettle.

In the preferred embodiment of the invention, e-caprolactam and m-xylylene diamine are employed. The m-xylylenediamine component can be added during the polymerization cycle or injected during extrusion. However, to obtain the most desirable results, the m-xylylenediamine should be added to the e-caprolactam melt prior to initiation of the polymerization cycle.

Various additional components may be added to the polyamide-forming reactants either prior to or during polymerization without adversely affecting the improvements of this invention, said components including; stabilizing agents such as manganese compounds, copper compounds and hindered phenols which protect the polymer against adverse effects of heat, ageing, oxidation, and light; reinforcing particles such as silica, and carbon black; adhesion-promoting agents; fluorescent materials and delustering agents such as titanium dioxide.

The following examples are provided to illustrate the instant invention more fully. They are provided for illustrative purposes only and are not to be construed as limiting the invention, which is defined by the appended claims.

Example 1 (control)

E-polycaproamide was prepared by charging a 3-liter autoclave, equipped with a nitrogen purge (50 cc./min.), with 1520 gms. of e-caprolactam, 80 gms. of aminocaproic acid, 6.4 gms. of an aqueous 50% titanium dioxide dispersion and 7.18 gms. of m-xylylenediamine (about 75 equivalents). The temperature of the autoclave was raised to 255° C. in one hour and said temperature was maintained for 6 to 8 hours. The reaction mixture was stirred continuously during polymerization. The polymer yield was about 1450 gms. The relative formic acid viscosity as determined in an aqueous 90% formic acid solution was 57.

The charge was washed and dried to remove unreacted monomer and then spun into 40 denier/12 filament yarn of 3.33 draw ratio. The yarn was then knitted into a tube or sleeve of about 3-4 inches in diameter. Sections of the sleeve were exposed in a xenon arc weatherometer at 80% relative humidity for 0, 5, 10 and 20 hours, respectively.

In order to accentuate the dye differential between exposed and unexposed yarn, an acid blue-disperse yellow dye system was used for test dyeings. The system was prepared by dispersing 0.05% Celliton Yellow GA (Color Index No. 11855) in an aqueous 0.3% sulfonine acid blue solution, the pH of the resulting system being about 7. Using this system, areas with reduced acid dye receptivity are predominantly colored by the disperse yellow dye. The temperature of the dye bath was raised at 90° C. during a period of 30 minutes after immersion of the yarn sample in said bath.

The unexposed yarn sample dyed to a deep blue. The exposed samples were compared with the unexposed sample to determine the loss in dye receptivity. The portion of the sample exposed to xenon light for 5 hours showed a slight loss in blue color; the portion of the sample exposed to ultraviolet light for 10 hours was slightly yellow; the portion of the sample exposed to ultraviolet light for 20 hours was completely yellow.

Since p-toluene sulfonic acid was not added to the polyamide in the preparation of the yarn samples in this experiment, these yarn samples were used as the control in further experiments, as set forth in Examples 2 and 3.

Example 2

A deep dyeing e-polycaproamide yarn was prepared as in Example 1, however, 9.91 gms. of an aqueous 50% p-toluene sulfonic acid solution was added to the charge during the polymerization cycle with continuous agitation. This corresponded to an acid addition of about 20 equivalents based on polymer yield.

The unexposed yarn sample dyed to a deep blue. The exposed samples were compared with corresponding control samples. The portion of the sample exposed to xenon light for 5 hours showed a very slight loss in blue color; the portion of the sample exposed to ultraviolet light for 10 hours showed a slight loss in blue color; the portion of the sample exposed to ultraviolet light for 20 hours showed a slight yellow—predominantly blue color.

Example 3

A deep dyeing e-polycaproamide yarn was prepared as in Example 2, however, the amount of p-toluene sulfonic acid solution added to the charge during the polymerization cycle was increased to 14.88 gms. of a 50% aqueous solution. This corresponded to an acid addition of about 30 equivalents.

The unexposed yarn sample dyed to a deep blue. The exposed samples were compared with corresponding control samples. The portion of the sample exposed to xenon light for 5 hours showed a very faint loss in blue color; the portion of the sample exposed to ultraviolet light for 10 hours showed a very slight loss in blue color; the portion of the sample exposed to ultraviolet light for 20 hours showed a very slight yellow—predominantly blue color, having an appearance almost identical with the control sample exposed to ultraviolet light for 5 hours.

Example 4

A deep-dyeing e-polycaproamide yarn was prepared as in Example 1, however, 4.3 grams of o-phenylene diamine having the structural formula

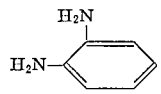

were added to the charge during the polymerization cycle in place of m-xylylenediamine. This corresponded to a diamine addition of about 57.5 equivalents based on polymer yield.

The unexposed sample dyed to a deep blue. The exposed samples were compared with an unexposed sample to determine the loss in dye receptivity. The portion of the sample exposed to xenon light for 5 hours showed a slight loss in blue color; the portion of the sample exposed to ultraviolet light for 10 hours was noticeably yellow; the portion of the sample exposed to ultraviolet light for 20 hours was completely yellow.

Example 5

A deep-dyeing e-polycaproamide yarn was prepared as in Example 4, however, 19.8 grams of a 50% aqueous solution of p-toluenesulfonic acid were added to the charge during the polymerization cycle. This corresponded to an acid addition of about 40 equivalents based on polymer yield.

The unexposed yarn sample dyed to a deep blue. The exposed samples were compared with corresponding control samples of Example 4 containing no p-toluenesulfonic acid. The portion of the sample exposed to xenon light for 5 hours showed a very faint loss in blue color; the portion of the sample exposed to ultraviolet light for 10 hours showed a very slight loss in blue color; the portion of the sample exposed for 20 hours showed a very slight yellow-predominantly blue color, having an appearance almost identical with the control sample exposed to ultraviolet light for only 5 hours.

Example 6

A deep-dyeing e-polycaproamide yarn was prepared as in Example 1, however, 11.08 gms. of bis-aminocyclohexyl methane having the structural formula

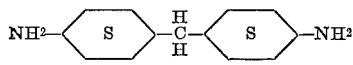

were added to the charge during the polymerization cycle in place of m-xylylenediamine. This corresponded to a diamine addition of about 75 equivalents based on polymer yield.

The unexposed sample dyed to a deep blue. The exposed samples were compared with an unexposed sample to determine the loss in dye receptivity. The portion of the sample exposed to xenon light for 5 hours showed a slight loss in blue color; the portion of the sample exposed to ultraviolet light for 10 hours was slightly yellow; the portion of the sample exposed to ultraviolet light for 20 hours was completely yellow.

Example 7

A deep dyeing e-polycaproamide yarn was prepared as in Example 6, however, 14.88 gms. of a 50% aqueous solution of p-toluenesulfonic acid were added to the charge during the polymerization cycle. This corresponded to an acid addition of about 30 equivalents based on polymer yield.

The unexposed yarn sample dyed to a deep blue. The exposed samples were compared with corresponding control samples containing no p-toluene sulfonic acid. The portion of the sample exposed to xenon light for 5 hours showed a very faint loss in blue color; the portion of the sample exposed to ultraviolet light for 10 hours showed a very slight loss in blue color; the portion of the sample exposed for 20 hours showed a very slight yellow-predominantly blue color, having an appearance almost identical with the control sample exposed to ultraviolet light for 5 hours.

Example 8

A deep dyeing e-polycaproamide yarn was prepared as in Example 1, however, 8.57 grams of menthane diamine (1,8 diamino p-menthane) having the structural formula

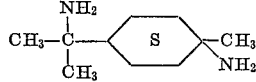

were added to the charge during the polymerization cycle in place of m-xylylenediamine. This corresponded to a diamine addition of about 70 equivalents based on polymer yield.

The unexposed sample dyed to a deep blue. The exposed samples were compared with an unexposed sample to determine the loss in dye receptivity. The portion of the sample exposed to xenon light for 5 hours showed a slight loss in blue color; the portion of the sample exposed to ultraviolet light for 10 hours was slightly yellow; the portion of the sample exposed to ultraviolet light for 20 hours was yellow.

Example 9

A deep dyeing e-polycaproamide yarn was prepared as in Example 8, however, 4.96 gms. of a 50% aqueous solution of p-toluenesulfonic acid were added to the charge during the polymerization cycle. This corresponded to an acid addition of about 10 equivalents based on polymer yield.

The unexposed yarn sample dyed to a deep blue. The exposed samples were compared with corresponding control samples containing no p-toluenesulfonic acid. The portion of the sample exposed to xenon light for 5 hours showed a very faint loss in blue color; the portion of the sample exposed to ultraviolet light for 10 hours showed a slight loss in blue color; the portion of the sample exposed for 20 hours showed a slight yellow-predominantly blue color.

Example 10

A deep dyeing e-polycaproamide yarn was prepared as in Example 1, however, 6.26 gms. of hexamethylene diamine were added to the charge during the polymerization cycle in place of m-xylylenediamine. This corresponded to a diamine addition of about 75 equivalents based on polymer yield.

The unexposed sample dyed to a deep blue. The exposed samples were compared with an unexposed sample to determine the loss in dye receptivity. The portion of the sample exposed to xenon light for 5 hours showed a slight loss in blue color; the portion of the sample exposed to ultraviolet light for 10 hours was slightly yellow; the portion of the sample exposed to ultraviolet light for 20 hours was noticeably yellow.

Example 11

A deep dyeing e-polycaproamide yarn was prepared as in Example 10, however, 19.8 gms. of a 50% aqueous solution of p-toluenesulfonic acid were added to the charge during the polymerization cycle. This corresponded to an acid addition of about 40 equivalents based on polymer yield.

The unexposed yarn sample dyed to a deep blue. The exposed samples were compared with corresponding control samples containing no p-toluenesulfonic acid. The portion of the sample exposed to xenon light for 5 hours showed a very faint loss in blue color; the portion of the sample exposed to ultraviolet light for 10 hours showed a very slight loss in blue color; the portion of the sample exposed for 20 hours showed a very slight yellow—predominantly blue color, having an appearance almost identical with the control sample exposed to ultraviolet light for 5 hours.

Example 12

A deep dyeing polyhexamethylenediamine adipamide nylon 6.6 was prepared by charging an autoclave with 1750 gms. of the salt of hexamethylenediamine and adipic acid, and 1750 cc. of distilled, $CO_2$-free, water. Then 9.25 grams of m-xylylenediamine corresponding to about 77 equivalents per $10^6$ gms. of polymer were added, followed by a small amount of flush water. The autoclave was closed and purged with nitrogen. The temperature was raised to 134° C. and the pressure was bled off to keep the pressure at 15 p.s.i. Approximately 1200 cc. of distillate came off. When no more water came off at this pressure, the reactor was closed and the temperature raised to 250° C. Any pressure above 250 p.s.i. was bled off. The temperature was raised steadily to 270° C. over the next 90 minutes while the pressure was lowered at the rate of 3 p.s.i. per minute. The polymer was extruded into water, pelletized and spun into yarn having a 210 total denier, comprised of 14 filaments. The yarn was knitted into a sleeve about 3.5 inches in diameter. A section of the sleeve was exposed to xenon light as in Example 1. The sleeve was dyed and evaluated as described in Example 1. The unexposed segment dyed to a deep blue. The segment exposed for 10 hours had a yellow cast; the segment exposed for 20 hours was completely yellow.

Example 13

A deep dyeing polyhexamethylene adipamide nylon 6.6 was prepared as in Example 12, however, 24.1 gms. of a 50% aqueous solution of p-toluene sulfonic acid (40 equivalents per $10^6$ gms. of polymer) were added. After 20 hours exposure to ultraviolet light, the sample showed only a very slight yellow—predominantly blue color, having an appearance almost identical with the control sample exposed to light for 5 hours.

What is claimed is:

1. A fiber-forming saturated aliphatic polyamide having an enhanced resistance to light degradation and having recurring amide groups as an integral part of the polymer chain, and wherein said amide groups are separated by at least 2 carbon atoms consisting essentially of a polyamide composition prepared from a self-polymerizable mono-amino-monocarboxylic acid, at least 10 mols per $10^6$ gms. of polymer of p-toluene sulfonic acid and in the presence of less than about 90 equivalents per $10^6$ gms. of polymer of a primary diamine.

2. A fiber-forming polyamide as described in claim 1, wherein the primary diamine is selected from the group consisting of m-xylylene diamine, o-phenylene diamine, bis-amino-cyclohexyl methane, 1,8 diamino p-menthane, hexamethylene diamine, said primary diamine is present in an amount of from about 57.5 to 90 equivalents per $10^6$ gms. of polymer, and said p-toluene sulfonic acid is present in an amount of from about 10 to 40 mols per $10^6$ gms. of polymer.

3. The fiber-forming polyamide of claim 2, wherein the polyamide composition is prepared from the lactam of an amino acid.

4. The fiber-forming polyamide of claim 3 wherein the polyamide composition is prepared from e-caprolactam.

5. The fiber-forming polyamide of claim 4, wherein said polyamide contains about 20–40 mols of p-toluene sulfonic acid and about 70–80 equivalents of m-xylylene-diamine.

6. A polyamide filament consisting essentially of the polyamide as defined in claim 5.

References Cited

UNITED STATES PATENTS

| | | | |
|---|---|---|---|
| 2,585,199 | 2/1952 | Watson | 260—78 |
| 2,765,294 | 10/1956 | England | 260—78 |
| 2,989,798 | 6/1961 | Bannerman | 260—78 |
| 3,065,207 | 11/1962 | Andres | 260—78 |
| 3,128,221 | 4/1964 | Flores | 260—78 |
| 3,235,533 | 2/1966 | Brinkman | 260—78 |
| 3,304,289 | 2/1967 | Ballentine et al. | 260—78 |
| 3,433,853 | 3/1969 | Earle et al. | 260—78 |
| 3,477,899 | 11/1969 | Kubitzek et al. | 260—78 |

HAROLD D. ANDERSON, Primary Examiner

U.S. Cl. X.R.

8—55; 57—140 R; 260—45.9 R, 78 A, 78 L